(12) United States Patent
Morishita et al.

(10) Patent No.: US 7,000,685 B2
(45) Date of Patent: Feb. 21, 2006

(54) COOLING SYSTEM FOR VEHICLE

(75) Inventors: Yusuke Morishita, Kuwana (JP); Yoshimitsu Inoue, Chiryu (JP)

(73) Assignee: DENSO Corporation, Kariya (JP)

( * ) Notice: Subject to any disclaimer, the term of this patent is extended or adjusted under 35 U.S.C. 154(b) by 0 days.

(21) Appl. No.: 10/852,712

(22) Filed: May 24, 2004

(65) Prior Publication Data
US 2004/0250995 A1 Dec. 16, 2004

(30) Foreign Application Priority Data
May 26, 2003 (JP) ............... 2003-147959

(51) Int. Cl.
F28F 7/00 (2006.01)
F28D 15/00 (2006.01)
F01P 7/14 (2006.01)

(52) U.S. Cl. ............... 165/80.4; 165/104.25; 123/41.1

(58) Field of Classification Search ............... 165/80.4, 165/104.19, 104.25, 104.31, 104.33, 104.34, 165/120, 121, DIG. 18, DIG. 50, 276, 287, 165/289, 41–42; 361/699–700; 123/41.09, 123/41.1, 41.13; 237/12.3 R
See application file for complete search history.

(56) References Cited

U.S. PATENT DOCUMENTS

| | | | | |
|---|---|---|---|---|
| 3,817,321 A | * | 6/1974 | Von Cube et al. | 165/104.22 |
| 3,934,644 A | * | 1/1976 | Johnston | 165/51 |
| 5,040,493 A | * | 8/1991 | Gajewski et al. | 123/41.31 |
| 5,095,855 A | * | 3/1992 | Fukuda et al. | 123/41.44 |
| 5,327,987 A | * | 7/1994 | Abdelmalek | 180/65.2 |
| 6,041,850 A | * | 3/2000 | Esser et al. | 165/104.33 |
| 6,182,742 B1 | * | 2/2001 | Takahashi et al. | 165/104.33 |
| 6,263,957 B1 | * | 7/2001 | Chen et al. | 165/80.4 |
| 6,321,697 B1 | * | 11/2001 | Matsuda et al. | 123/41.29 |
| 6,390,031 B1 | * | 5/2002 | Suzuki et al. | 123/41.1 |
| 6,668,911 B1 | * | 12/2003 | Bingler | 165/80.4 |
| 6,754,076 B1 | * | 6/2004 | Cox et al. | 361/699 |
| 2001/0023758 A1 | | 9/2001 | Osakabe | |
| 2003/0056772 A1 | * | 3/2003 | Borrmann et al. | 123/563 |
| 2003/0201092 A1 | * | 10/2003 | Gwin et al. | 165/80.4 |
| 2004/0098174 A1 | * | 5/2004 | Suda et al. | 700/299 |

* cited by examiner

*Primary Examiner*—Tho Duong
(74) *Attorney, Agent, or Firm*—Harness, Dickey & Pierce, PLC

(57) ABSTRACT

In a cooling system for cooling a heating element mounted in a vehicle, a radiator is located at a position higher than a heat sink, which absorbs heat from the heating element. When the amount of heat generated from the heating element, which is detected by a sensor, is greater than a predetermined first value, a blower is operated. Further, when the detected amount of heat is greater than a predetermined second value that is higher than the predetermined first value, a pump is operated. When the detected amount of heat is equal to or less than the predetermined first value, the pump is stopped and the cooling water is circulated by a principle of heat siphon. Accordingly, power consumption of the pump is reduced. Further, power consumption of the cooling system is reduced or an increase in power consumption of the cooling system is restricted.

17 Claims, 3 Drawing Sheets

2(1)   FRONT ⟷ REAR

2(1)

COOLING SYSTEM FOR VEHICLE

CROSS REFERENCE TO RELATED APPLICATION

This application is based on Japanese Patent Application No. 2003-147959 filed on May 26, 2003, the disclosure of which is incorporated herein by reference.

FIELD OF THE INVENTION

The present invention relates to a cooling system for a vehicle, which is suitable for use in a hybrid vehicle driven by a combination of an electric motor and an internal combustion engine.

BACKGROUND OF THE INVENTION

In previous hybrid vehicles, power consumption of an electric motor for driving is generally smaller than that of an engine. Therefore, the amount of heat generated from such as the driving electric motor or a driving electric circuit for driving the driving electric motor, including an inverter circuit, is generally small. Accordingly, a heat radiating capacity required to a cooling system for such vehicles is not so large.

In recent years, however, the hybrid vehicles are required to have a driving performance or an accelerating performance on the same level as that of normal vehicles, which are driven only by engines. With this, power consumption of the driving electric motor tends to increase, resulting in an increase in the amount of heat generation at the electric motor for driving and the driving electric circuit.

To address this issue, it may be conceived to increase a circulation rate of cooling water by enlarging a pump device, which circulates the cooling water having absorbed waste heat generated from an heating element such as the driving electric motor, the driving electric circuit, or the like. However, this results in an increase in power consumption of the pump device. Furthermore, if the pump device is enlarged, it may be difficult to ensure a space for mounting the large pump device in an engine compartment.

It is also conceived to increase a heat radiating capacity of a radiator. However, this results in an increase in a size of the radiator. Thus, it is also difficult to ensure the space for mounting such a large radiator in the engine compartment.

SUMMARY OF THE INVENTION

The present invention is made in view of the foregoing matters, and it is an object of the present invention to provide a cooling system capable of reducing its power consumption or restricting an increase in its power consumption.

According to the present invention, a cooling system for cooling a heating element mounted includes a heat sink and a radiator. The heat sink communicates with the radiator through a cooling fluid circuit through which a cooling fluid flows. The cooling fluid absorbs the heat generated from the heating element through the heat sink. The radiator radiates the heat of the cooling fluid, thereby cooling the heating element. In the cooling system, the radiator is located at a position higher than the heat sink.

Accordingly, the cooling fluid can be circulated without requiring an operation of a pump. Therefore, power consumption of the cooling system is reduced or an increase in power consumption of the cooling system is restricted. When the pump is provided in the cooling fluid circuit, an operation of the pump is controlled in accordance with the amount of heat generated from the heating element. Because a circulation rate of the cooling fluid by the pump operation is reduced, power consumption of the pump is reduced.

BRIEF DESCRIPTION OF THE DRAWINGS

Other objects, features and advantages of the present invention will become more apparent from the following detailed description made with reference to the accompanying drawings, in which.

DETAILED DESCRIPTION OF EMBODIMENTS

Figure 1:
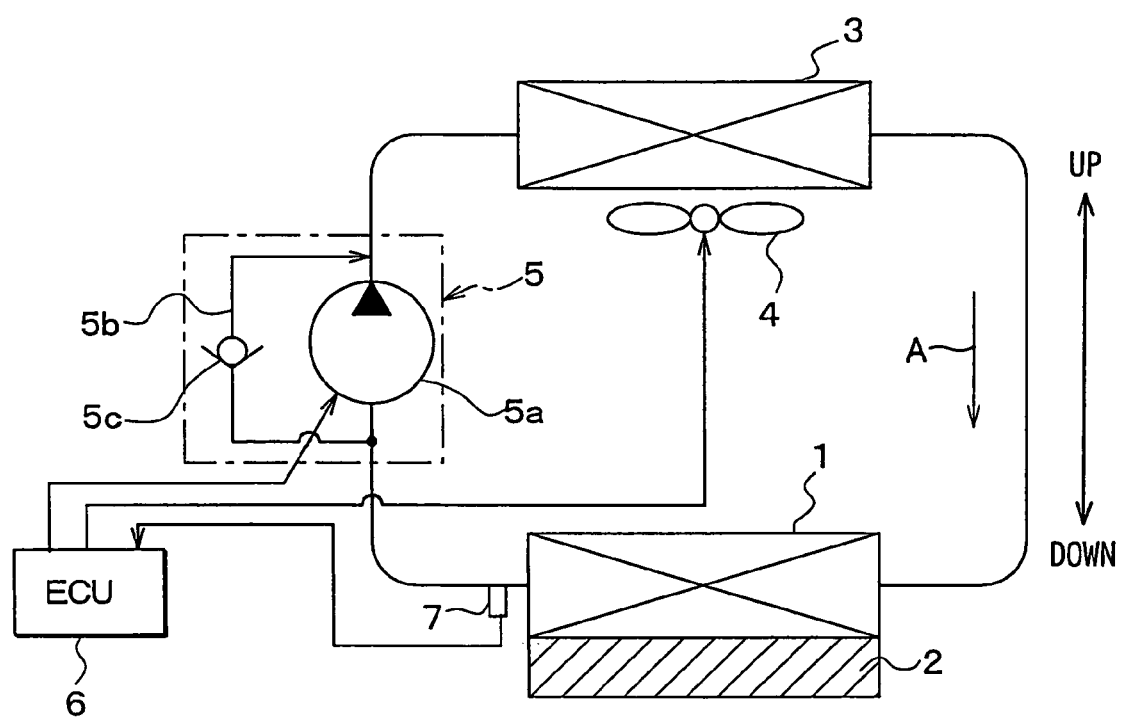
FIG. 1 is a schematic diagram of a cooling system according to a first embodiment of the present invention.

Embodiments of the present invention will be described hereinafter with reference to the drawing.

(First Embodiment)

A cooling system of the present invention is employed to hybrid vehicles, which is driven by an internal combustion engine and an electric motor. Especially, the cooling system of the embodiment is employed to a hybrid vehicle, which is driven by automatically selecting one of an engine driving mode, an electric motor driving mode and an engine and electric motor combination mode, according to a driving condition.

Figure 2:
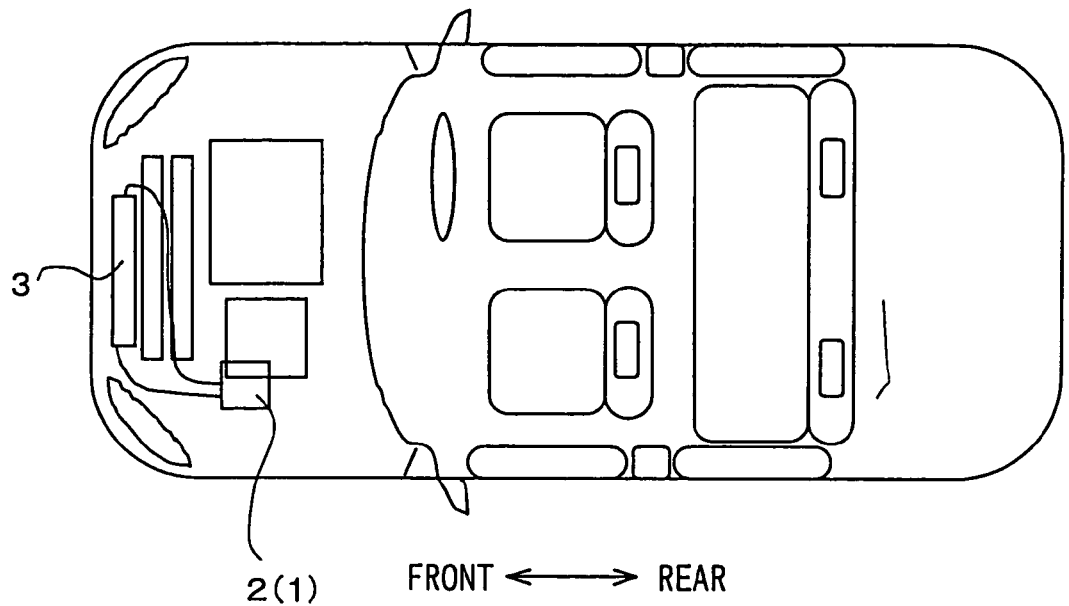
FIG. 2 is a schematic illustration of a vehicle in which the cooling system is mounted according to the first embodiment of the present invention.
Figure 3:
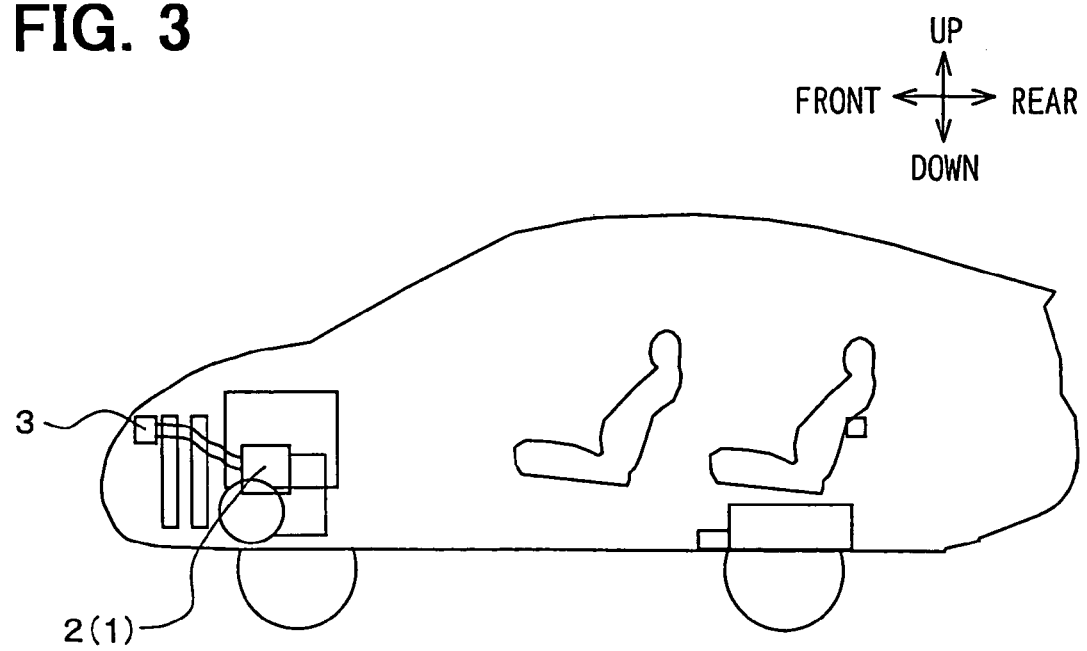
FIG. 3 is a schematic illustration of the vehicle shown in FIG. 2 when viewed from a side.

As shown in FIGS. 1 to 3, the cooling system of the embodiment has a heat sink 1, a radiator 3, a blower 4, a pump device 5, an electric control unit (ECU) 6 and a sensor 7. The heat sink 1 is provided as a heat exchanger to absorb a waste heat generated from a driving electric circuit 2 that supplies a driving current to an electric motor for driving. The driving electric circuit 2 is a heating element and includes an inverter circuit supplying the driving current and the like. The amount of the waste heat generated by the driving electric circuit 2 is increased with an increase in the amount of the driving electric current. The waste heat is transferred to a cooling water (cooling fluid) through the heat sink 1.

The radiator 3 is a heat exchanger performing heat exchange between the cooling water, which has absorbed the waste heat at the heat sink 1, and air, thereby radiating the waste heat to the atmosphere. The radiator 3 is connected to the heat sink 1 through a pipe. As shown in FIG. 3, the radiator 3 is arranged at a position higher than the heat sink 1 in the vehicle.

The blower 4 is provided to create a flow of cooling air toward the radiator 3. The pump device 5 is provided in a cooling water circuit to circulate the cooling water between the radiator 3 and the heat sink 1. In the embodiment, the pump device 5 includes a pump portion 5a, a bypass passage 5b through which the cooling water bypasses the pump portion 5a, and a check valve 5c for preventing the cooling water from flowing backward through the bypass passage 5b from a discharge side of the pump portion 5a to a suction side of the pump portion 5b.

The ECU 6 controls operations of the blower 4 and the pump device 5 (pump portion 5a) based on the amount of heat (calorific value) generated from the driving electric circuit 2, in accordance with a program, which is stored beforehand. In the embodiment, the amount of heat is determined based on a temperature of the cooling water discharging from the heat sink 1. The temperature of the cooling water is detected by the cooling water sensor 7.

Next, characteristic operation of the cooling system will be described.

Since the radiator 3 is located higher than the heat sink 1, the cooling water circulates in the cooling water circuit by the principle of a heat siphon. The temperature of the cooling water, which has absorbed the waste heat of the driving electric circuit 2 through the heat sink 1, is increased, so the cooling water is boiled. As a result, an inside pressure is increased. The cooling water is urged toward the radiator 3 by the increased inside pressure. Here, the flow of the cooling water is limited in one direction by the check valve 5c. The cooling water flows in the cooling water circuit in the direction shown by an arrow A in FIG. 1.

When an operation of the pump device 5 (pump portion 5a) is stopped, the cooling water flows in the radiator. 3 through the bypass passage 5b. On the other hand, when the pump portion 5a is operated, the cooling water is mainly drawn by the pump portion 5a and flows in the radiator 3. In the radiator 3, the cooling water is cooled by radiating the heat to the outside air. Then, the cooling water returns to the heat sink 1 and absorbs heat from the driving electric circuit 2.

Figure 4:
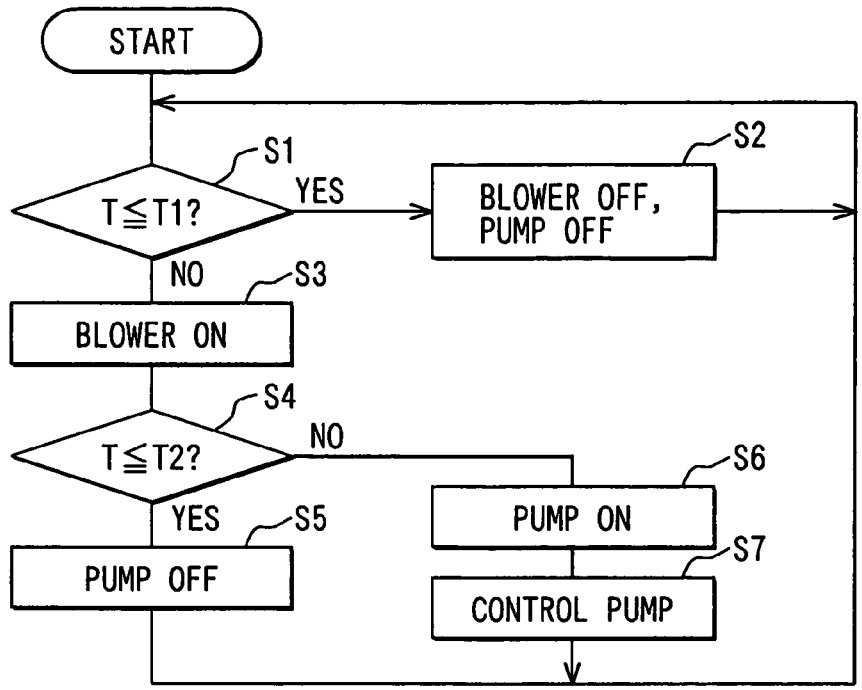
FIG. 4 is a flow chart showing a control of the cooling system according to the first embodiment of the present invention.

The operations of the blower 4 and the pump 5 are performed based on a flow chart shown in FIG. 4.

First, at a step S1, it is determined whether the amount of heat from the driving electric circuit 2 is equal to or lower than a predetermined first value. Specifically, it is determined whether a detected temperature T of the sensor 7 is equal to or lower than a predetermined first level T1.

When it is determined that the detected temperature T is equal to or lower than the predetermined first level T1, the operations of the blower 4 and the pump portion 5a are stopped, at a step S2. On the other hand, when it is determined that the detected temperature T is higher than the predetermined first level T1, the blower 4 is operated, at a step S3.

Next, at a step S4, it is determined whether the detected temperature T is equal to or lower than a predetermined second level T2 that is higher than the predetermined first level T1. When it is determined that the detected temperature T is equal to or lower than the predetermined second level T2, which is higher than the predetermined first level T1, the operation of the pump portion 5a is stopped, at a step S5. On the other hand, when it is determined that the detected temperature T is higher than the predetermined second level T2, the pump portion 5a is operated, at a step S6.

Further, at a step S7, a rotation speed of the pump device 5, that is, a circulation rate of the cooling water, is increased from a minimum level to a maximum level stepwise or continuously (non-stepwise) in accordance with an increase in the detected temperature T.

Here, the predetermined first level T1 and the predetermined second level T2 are decided based on heat exchanging capacity of the heat sink 1 and the radiator 3 with reference to an appropriate temperature (for example, 60 degrees Celsius) of the driving electric circuit 2.

Next, advantageous effects of the embodiment will be described.

In the cooling system of the embodiment, the cooling water is circulated by using such as vapor pressure created by the waste heat. Therefore, power consumption of the pump device 5 is reduced. Accordingly, power consumption of the cooling system is reduced or an increase in the power consumption of the cooling system is restricted.

Also, the circulation rate of the cooling water by the operation of the pump device 5 is reduced. Therefore, the pump device 5 is not enlarged. Accordingly, it is easy to ensure a space for mounting the pump device 5.

When the amount of heat generated from the heating element 2 is equal to or lower than the predetermined value, that is, when the detected temperature T is equal to or lower than the predetermined level, the blower 4 is stopped. When the detected temperature T is higher than the predetermined level, the blower 4 is operated. Accordingly, power consumption of the blower 4 is reduced. Further, power consumption of the cooling system is reduced or an increase in the power consumption of the cooling system is restricted.

Also, when the amount of heat generated from the heating element 2 is equal to or lower than the predetermined level, that is, when the detected temperature T is equal to or lower than the predetermined level, the pump portion 5a is stopped. When the detected temperature T is higher than the predetermined level, the pump portion 5a is operated. Accordingly, the power consumption of the pump device 5 is reduced. With this, the power consumption of the cooling system is further reduced or the increase in the power consumption of the cooling system is further restricted.

(Second Embodiment)

Figure 5:
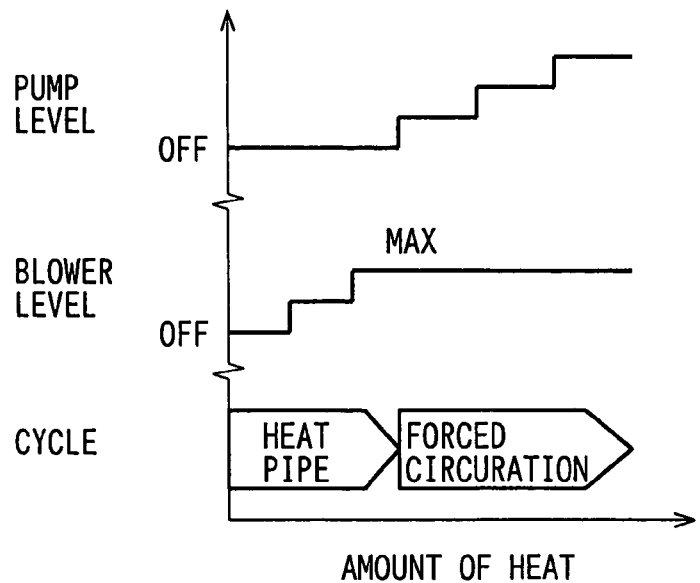
FIG. 5 is a chart showing a control of the cooling system according to a second embodiment of the present invention.

In the first embodiment, the on and off operation of the blower 4 is performed with reference to the predetermined first level T1 as a threshold level. In the second embodiment, as shown in FIG. 5, an air blowing level of the blower 4 is increased stepwise from a minimum level to a maximum level with an increase in the amount of heat, that is, with the increase in the detected temperature T. Also, when the air blowing level of the blower 4 is lower than the maximum level, the pump portion 5a is stopped. Even when the air blowing level of the blower 4 is on the maximum level, if the detected temperature T is higher than a predetermined temperature, the circulation rate of the cooling water by the pump portion 5a is increased stepwise in accordance with the increase in the detected temperature T. Accordingly, the power consumption of the blower 4 and the pump device 5 are effectively reduced.

In the second embodiment, the cooling water circulation rate by the pump portion 5a is increased stepwise with the increase in the detected temperature T. Alternatively, the cooling water circulation rate by the pump portion 5a can be increased continuously (non-stepwise) with the increase in the detected temperature T.

(Other Embodiments)

In the first and second embodiments, the pump portion 5a, the bypass passage 5b and the check valve 5c are integrated into the pump device 5. However, the present invention is not limited to the above.

In the first and the second embodiments, it is described that the cooling water is circulated based on the principle of heat siphon. However, the present invention is not limited to this. For example, the cooling water can be circulated based on a principle of a boiling, cooling-type heat exchanger. In the boiling, cooling-type heat exchanger, heat exchange is performed between the driving electric circuit 2 and the outside air by a natural circulation of a refrigerant (cooling water). The refrigerant boils in the heat sink 1 and condenses in the radiator 3 by using temperature difference. Because gas refrigerant moves upward and liquid refrigerant moves downward by its gravity force, the refrigerant naturally circulates in the circuit. At this time, the waste heat of the driving electric circuit 2 is absorbed by a heat of vaporization when the refrigerant boils in the heat sink 1. In the radiator 3, the heat is radiated by condensation of the refrigerant.

In the above embodiments, the cooling system of the present invention is employed to cool the driving electric circuit 2. However, the present invention is not limited to the above. The cooling system of the present invention can be employed to cool another heating element such as another electrical devices.

In the above embodiments, the amount of heat generated from the heating element such as the driving electric circuit 2 is detected based on the temperature detected by the temperature sensor 7. However, the present invention is not limited to the above. For example, the amount of heat or a calorific value of the driving electric circuit 2 can be detected based on the amount of power inputted to the driving electric circuit 2.

The present invention is not limited to the above embodiments, but may be implemented in other ways without departing from the spirit of the invention.

What is claimed is:

1. A cooling system for cooling a heating element, the cooling system comprising:
    a heat sink through which a cooling fluid passes to absorb heat from the heating element;
    a radiator communicating with the heat sink through a cooling fluid circuit through which the cooling fluid flows, wherein the radiator radiates the heat of the cooling fluid and is located at a position higher than the heat sink;
    a pump portion that is arranged between the heat sink and the radiator in the cooling fluid circuit and pumps the cooling fluid to circulate the cooling fluid through the cooling fluid circuit;
    a bypass passage that is arranged in the cooling fluid circuit to bypass the pump portion, wherein when operation of the pump portion is stopped, the cooling fluid flows in the radiator through the bypass passage while bypassing the pump portion; and
    means for controlling the pump portion, wherein
    the pump portion is stopped by the means for controlling the pump portion when an amount of heat generated from the heating element is equal to or less than a predetermined value, and the pump portion is operated by the means for controlling the pump portion when the amount of heat generated from the heating element is greater than the predetermined value.

2. The cooling system according to claim 1, further comprising:
    a blower for creating a flow of air toward the radiator; and
    means for controlling the blower, wherein
    the blower is stopped by the means for controlling the blower when an amount of heat generated from the heating element is equal to or less than a predetermined value, and the blower is operated by the means for controlling the blower when the amount of heat is greater than the predetermined value.

3. The cooling system according to claim 1, further comprising:
    a blower for creating a flow of air toward the radiator; and
    means for controlling the blower, wherein
    the blower is stopped by the means for controlling the blower when an amount of heat generated from the heating element is equal to or less than a predetermined first value, and the blower is operated by the means for controlling the blower when the amount of heat is greater than the predetermined first value, and
    the pump portion is stopped by the means for controlling the pump portion when the amount of heat is equal to or less than a predetermined second value that is greater than the predetermined first value, and the pump portion is operated by the means for controlling the pump portion when the amount of heat is greater than the predetermined second value.

4. The cooling system according to claim 1, further comprising:
    a blower for creating a flow of air toward the radiator;
    air-blowing amount controlling means for controlling an amount of air blown by the blower based on an amount of heat generated from the heating element; and
    the means for controlling the pump portion controls a circulation rate of the cooling fluid circulated by the pump portion based on the amount of heat generated from the heating element.

5. The cooling system according to claim 4, wherein
    the means for controlling the pump portion stops an operation of the pump portion when the air-blowing amount of the blower is less than a maximum level.

6. The cooling system according to claim 5, wherein
    the means for controlling the pump portion increases the circulation rate of the cooling fluid circulated by the pump portion with an increase in the amount of heat of the heating element when the air-blowing amount of the blower is on a maximum level.

7. The cooling system according to claim 1, wherein the heating element is an electrical device mounted in a vehicle.

8. The cooling system according to claim 1, wherein the heating element includes a driving electric circuit for driving a driving motor of a vehicle.

9. The cooling system according to claim 1 mounted in a hybrid vehicle that is driven by an electric motor and an engine.

10. The cooling system according to claim 1, further comprising a check valve that is arranged in the cooling fluid circuit to prevent the cooling fluid from flowing backward through the bypass passage from a discharge side of the pump portion to a suction side of the pump portion.

11. The cooling system according to claim 1, further comprising flow regulating means for limiting a flow of the cooling liquid in the bypass passage from a radiator side end of the bypass passage to a heat sink side end of the bypass passage while enabling a flow of the cooling liquid from the heat sink side end of the bypass passage to the radiator side end of the bypass passage.

12. The cooling system according to claim 11, wherein the pump portion is arranged between an outlet of the heat sink and an inlet of the radiator.

13. The cooling system according to claim 12, wherein:
    the radiator side end of the bypass passage is located between an outlet of the pump portion and the inlet of the radiator in the cooling fluid circuit; and
    the heat sink side end of the bypass passage is located between an inlet of the pump portion and the outlet of the heat sink in the cooling fluid circuit.

14. The cooling system according to claim 11, wherein the cooling fluid circuit provides an unobstructed passage that directly connects between an outlet of the radiator and an inlet of the heat sink.

15. The cooling system according to claim 1, further comprising:

a blower for creating a flow of air toward the radiator; wherein the means for controlling the pump portion also controls the blower;

when an amount of heat generated from the heating element is equal to or less than a first predetermined value, the control means stops the blower and the pump portion; and when the amount of heat generated from the heating element increases beyond the first predetermined value, the control means first operates the blower without operating the pump and then operates the blower and the pump upon further increase of the amount of heat generated from the heating element.

16. The cooling system according to claim 15, further comprising temperature sensing means for sensing a temperature of the cooling fluid, wherein:

the control means stops the blower and the pump portion when the sensed temperature of the cooling fluid, which is sensed by the temperature sensing means, is equal to or lower than a predetermined first level;

the control means operates the blower and stops the pump portion when the sensed temperature of the cooling fluid is higher than the predetermined first level and is equal to or lower than a predetermined second level that is higher than the predetermined first level; and the control means operates blower and the pump portion when the sensed temperature of the cooling fluid is higher than the predetermined second level.

17. The cooling system according to claim 16, wherein the temperature sensing means is a temperature sensor arranged in the cooling fluid circuit.

* * * * *